Feb. 19, 1952
A. W. SMITH
2,586,268
CHAIN
Filed June 13, 1949
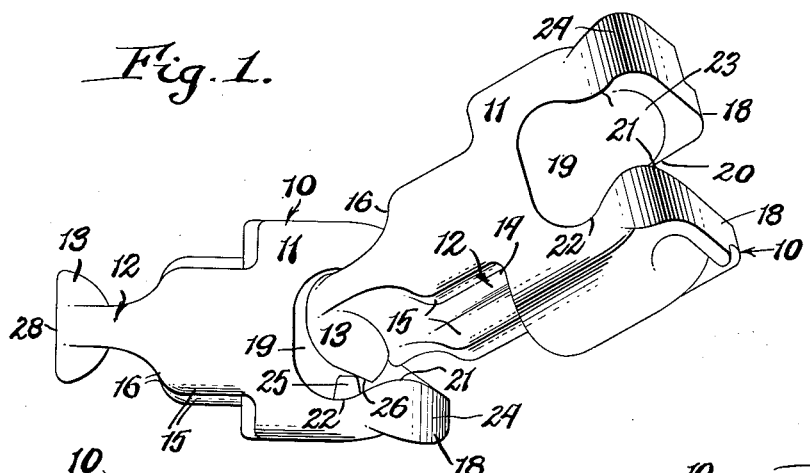
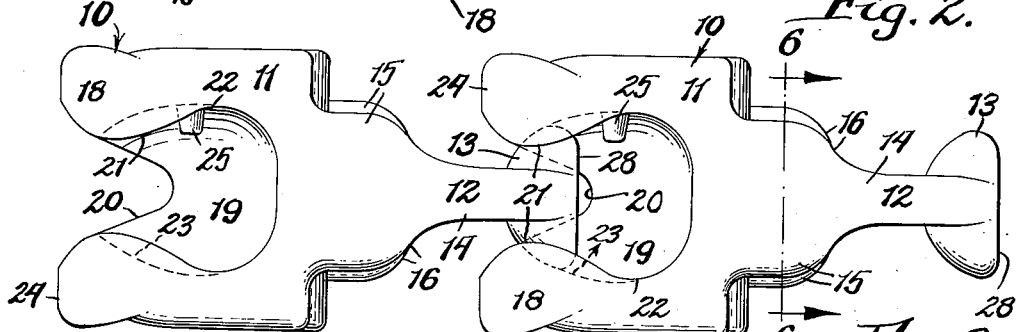
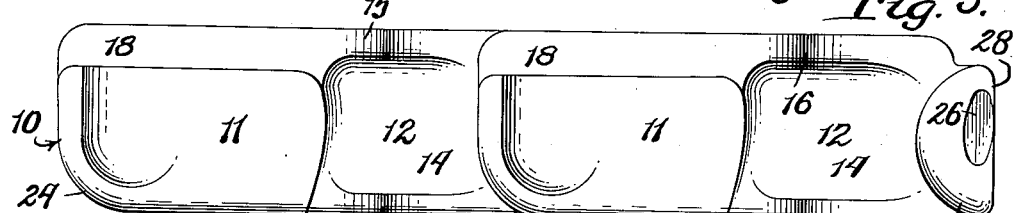
INVENTOR.
Albert Woodall Smith
BY
Popp and Popp
Attorneys.

Patented Feb. 19, 1952

2,586,268

UNITED STATES PATENT OFFICE 2,586,268

CHAIN

Albert W. Smith, Kenmore, N. Y., assignor, by mesne assignments, to Pressed Steel Car Company, Inc., a corporation of Pennsylvania Application June 13, 1949, Serial No. 98,655

6 Claims. (Cl. 74—246)

This invention relates to chains and more particularly to conveyer chains such as are used to convey various articles along one of the stretches thereof.

One of the objects of the invention is to provide a chain of this type, the links of which are so formed and coupled that the chain is capable of flexing in any direction and the links of which are also capable of a limited torsional movement with reference to one another so that the chain is capable of twisting.

Another object is to provide such a chain, the links of which can be readily assembled and disassembled to permit repairs to be made easily and quickly.

A further important object of the present invention is to provide such a chain in which there is no danger of the links becoming accidentally detached in service and which require a particular and unusual manipulation to separate and join the links, which manipulation is never encountered under service conditions.

Other objects and advantages of the invention will be apparent from the following description and drawings in which:

Fig. 1 is a bottom plan view of a pair of links embodying the present invention, one of these links being shown in its normal position and the other link being shown as turned to that position which permits of the separation of the links.

Fig. 2 is a bottom plan view of the pair of links, showing both of the links in their operative relation.

Fig. 3 is a side elevation of the pair of links shown in Fig. 2.

Fig. 4 is a vertical longitudinal central section taken through the pair of links.

Fig. 5 is an end elevational view of one of the links, this view being taken from the right hand end of Fig. 3.

Fig. 6 is a vertical section taken on line 6—6, Fig. 2.

The chain forming the subject of the present invention is formed of a plurality of identical links 10, each of which is provided with an enlarged body portion 11 which is shown as being generally rectangular in cross section, although the same can be of any suitable form. The link can be in the form of a casting or forging and is shown as provided with an integral neck 12 projecting outwardly from the body portion 11 and which neck is formed to provide a segment of a ball or half-ball 13 at its outer extremity, the spherical face of the half-ball 13 opposing or facing the body 11. The neck 12 is in the form of a vertical web 14 provided with upper and lower flanges 15 so that the neck is of I-beam form in cross section, as best shown in Fig. 6. The upper and lower faces of these flanges 15 are coplaner with the upper and lower faces of the body 10 and these flanges terminate short of the half-ball 13 and are formed with rounding shoulders 16 to permit articulation of the links of the chain as hereinafter described.

The end of each link opposite its half-ball 13 is bifurcated to provide two knuckles 18, these knuckles being jointly provided by a socket 19 extending upwardly from the bottom face of the body 11 and inwardly from the adjacent end of the link along the major axis thereof and by a rounding V-shaped slot 20 in the wall between the socket 19 and the top face of the body 11 and also inwardly from the adjacent end of the link along the major axis thereof. This socket is of sufficient size to receive the half-ball 13 of a companion link and to retain this ball in the socket, the knuckles 18 being provided with opposing lips 21 which embrace the half-ball and provide the spherical working faces therefor. Each of these lips starts at the point designated at 22 and extends around the inner face of the corresponding knuckle to the V-shaped slot 20 so as to provide a spherical bearing or working face 23 which forms the seat for the half-ball of the next succeeding link of the chain. The distance between the extremities of the lips 21 designated at 22 and the axial extremity of the socket 19 is sufficient to permit insertion of the half-ball 13 of the next succeeding link into this socket from the under face of the link and the shape of the lips 21, knuckles 18, V-shaped slot 20 and neck 12 with its flanges 15 is such that any link can be turned in any direction a substantial distance out of axial alinement with its companion links and can also be rotated to a substantial extent with reference to its companion links about the common axis thereof. The outer extremities of the knuckles 18 of each link are preferably rounded, as indicated at 24 to fit the spaced rows of teeth of the usual sprocket (not shown) used to drive the conveyer chain.

The feature of the invention resides in the provision of means preventing the separation of any pair of links of the chain except by a special and unusual manipulation thereof and which would not be encountered under any service condition. By this means accidental separation of the chain in service, regardless of any changing direction of travel or twisting thereof, is prevented. To this end each link is provided within the socket 19 and at one side thereof with a teat or projection 25, the teat or projection being near the lower face of the link but spaced therefrom and being approximately in a vertical plane intersecting the points 22 of the lips 21 and being arranged inside of the corresponding knuckle 18. On the same side of the link a depression or flat 26 is provided on its half-ball 13, this depression or flat interrupting the continuity of the spherical face of the ball at the edge thereof opposite the neck 12 and defined by the flat end face 23, and this depression or flat 26 being disposed in a generally vertical plane at an angle of approximately 45° to the major axis of the link and intersecting a part of the generally flat outer face 28 of the half-ball as well as the semispherical face thereof. While this depression 26 is shown as being in the form of a flat for convenience in producing same, this depression obviously could be of any cross sectional form. It will further be noted that in the assembled condition of any two links of the chain the teat 25 of one of the links is disposed adjacent the flat end face 28 of the half-ball of the other and projects sufficiently far to prevent this half-ball from moving toward the inner end of this socket sufficiently far to free this half-ball from the lips 21. It will further be noted that this retention of the half-ball in the outer part of the socket, that is, toward the spherical working faces 23, obtains regardless of the angular relation of the pair of links and regardless of the relative relation of the two links, the links only being separable when brought to an extreme angular and rotative relation and then moved in a predetermined substantially straight path with reference to each other.

To so separate any pair of links, one link is swung downwardly about the ball and socket to be uncoupled so that the links are at about a 45° angle to each other and at the same time the link being so swung is rotated and swung to one side so as to bring the teat 25 and depression or flat 26 of this ball and socket into mating or registering relation with each other. In this position the link so swung can be moved in the plane of this flat and out through the inner end of the socket 19. The reassembly of these links can be effected, of course, by a reverse of the above procedure.

It will be seen that the above manipulation is unusual and that such movement of the links would never occur under service conditions. It will also be seen that the invention can be embodied in a conveyer chain at very little addition to the cost and at no sacrifice of the strength or serviceability thereof.

I claim:

1. In a pair of connected links of a chain, one of which links has a body, a neck projecting from one end of said body and a segment of a ball attached to said neck with its spherical face opposing said body and the other of which links has a body, a socket extending inwardly from one side and one end of said body and opposing lips extending from said one side of said body and adjacent said one end thereof part way across said socket to embrace and retain said ball, said lips, ball, socket and neck being shaped to permit limited angular movement of said pair of links relative to each other in all directions and said lips extending from said one end of its body to points short of the opposite end of said socket to permit said ball segment to be withdrawn from said opposite end of said socket, the combination therewith of means preventing accidental uncoupling of said pair of links, comprising a projection projecting from the interior wall of said socket adjacent the end of said ball segment opposite said neck to prevent direct movement thereof to a position to be so withdrawn from said socket, and said ball segment being provided with a depression interrupting the continuity of said spherical face at the edge thereof opposite said neck and said depression being adapted to be brought into mating relation with said projection upon a predetermined manipulation of said links to permit said ball segment to pass said projection and be so withdrawn from said socket.

2. In a pair of connected links of a chain, one of which links has a body, a neck projecting from one end of said body and a segment of a ball attached to said neck with its spherical face opposing said body, and the other of which links has a body, a socket extending inwardly from one side and one end of said body and opposing lips extending from said one side of said body and adjacent said one end thereof part way across said socket to embrace and retain said ball segment, said lips, ball segment, socket and neck being shaped to permit limited angular movement of said pair of links relative to each other in all directions and said lips extending from said one end of its body to points short of the opposite end of said socket to permit said ball segment to be withdrawn from said opposite end of said socket, the combination therewith of means preventing accidental uncoupling of said pair of links, comprising a teat arranged adjacent the end of said ball segment opposite said neck and also adjacent one of said points and projecting from the interior wall of said socket to prevent direct movement of said ball segment to a position in said opposite end of said socket to be withdrawn therefrom, and said ball segment being provided on the side adjacent said teat with a depression interrupting the continuity of said spherical face at the edge thereof opposite said neck and said depression being arranged at an angle to the axis of said neck and adapted to be brought into mating relation with said teat upon a predetermined manipulation of said links to permit said ball segment to pass said teat and be so withdrawn from said socket.

3. In a pair of connected links of a chain, one of which links has a body, a neck projecting from one end of said body and a half-ball attached to said neck with its spherical face opposing said body, and the other of which links has a body, a socket extending inwardly from one side and one end of said body and opposing lips extending from one side of said body and adjacent said one end thereof part way across said socket to embrace and retain said half-ball, said lips, half-ball, socket and neck being shaped to permit limited angular movement of said pair of links relative to each other in all directions and said lips extending from said one end of its body to points short of the opposite end of said socket to permit said half-ball to be withdrawn from said opposite end of said socket, the combination therewith of means preventing accidental uncoupling of said pair of links, comprising a teat adjacent the generally flat end of said half-ball and also adjacent one of said points and projecting from the interior wall of said socket to prevent direct movement of said half-ball to a position in said opposite end of said socket to be withdrawn therefrom and said half-ball being provided on the side adjacent said teat with a flat intersecting its spherical and generally flat faces and arranged at an angle to the axis of said neck and adapted to be brought into mating relation with said teat upon a predetermined manipulation of said links to permit said half-ball to pass said teat and be so withdrawn from said socket.

4. In a link adapted to be coupled with a pair of substantially identical companion links to provide a chain, and having a body, a neck projecting from one end of said body, a segment of a ball attached to said neck with its spherical face opposing said body, a socket extending inwardly from one side and from the opposite end of said body, and opposing lips extending from said one side of said body and adjacent said opposite end thereof part way across said socket to embrace and retain the ball segment of one companion link coupled thereto, said lips, ball segment, socket and neck being shaped to permit limited angular movement of said companion coupled links relative to each other and said lips extending from said opposite end of said body to points short of the opposite end of said socket to permit said ball segment of said one companion coupled link to be withdrawn from said opposite end of said socket, the combination therewith of means preventing accidental uncoupling of said companion coupled links, comprising a projection projecting from the interior wall of said socket adjacent the end of the ball segment of said one companion coupled link to prevent direct movement thereof to a position to be so withdrawn from said socket, and said ball segment being provided with a depression interrupting the continuity of said spherical face at the edge thereof opposite said neck and said depression being adapted to be brought into mating relation with the said projection of another companion coupled link upon a predetermined manipulation thereof to permit said ball segment to pass said projection of said another companion coupled link and be so withdrawn from the socket of said another companion coupled link.

5. In a link adapted to be coupled with a pair of substantially identical companion links to provide a chain, and having a body, a neck projecting from one end of said body, a segment of a ball attached to said neck with its spherical face opposing said body, a socket extending inwardly from one side and from the opposite end of said body, and opposing lips extending from said one side of said body and adjacent said opposite end thereof part way across said socket to embrace and retain the ball segment of one companion link coupled thereto, said lips, ball segment, socket and neck being shaped to permit limited angular movement of said companion coupled links relative to each other and said lips extending from said opposite end of said body to points short of the opposite end of said socket to permit said ball segment of said one companion coupled link to be withdrawn from said opposite end of said socket, the combination therewith of means preventing accidental uncoupling of said companion coupled links, comprising a teat arranged adjacent the end of the ball segment of said one companion coupled link opposite its neck and also adjacent one of said points and projecting from the interior wall of said socket to prevent direct movement of said ball segment of said one companion coupled link to a position to be so withdrawn from said socket, and said ball segment being provided on the side adjacent the teat of another companion coupled link with a depression interrupting the continuity of said spherical face at the edge thereof opposite said neck and said depression being arranged at an angle to the axis of said neck and adapted to be brought into mating relation with said teat of said another companion coupled link upon a predetermined manipulation thereof to permit said ball segment to pass said teat of said another companion coupled link and be so withdrawn from the socket of said another companion coupled link.

6. In a link adapted to be coupled with a pair of substantially identical companion links to provide a chain, and having a body, a neck projecting from one end of said body, a half-ball attached to said neck with its spherical face opposing said body, a socket extending inwardly from one side and from the opposite end of said body, and opposing lips extending from said one side of said body and adjacent said opposite end thereof part way across said socket to embrace and retain the ball of one companion link coupled thereto, said lips, half ball, socket, and neck being shaped to permit limited angular movement of said companion coupled links relative to each other and said lips extending from said opposite end of said body to points short of the opposite end of said socket to permit said half-ball of said one companion coupled link to be withdrawn from said opposite end of said socket, the combination therewith of means preventing accidental uncoupling of said companion coupled links, comprising a teat arranged adjacent the generally flat end of the half-ball of said one companion link and also adjacent one of said points and projecting from the interior wall of said socket to prevent direct movement of said half-ball of said one companion coupled link to a position to be so withdrawn from said socket and said half-ball being provided on the side adjacent the teat of another companion coupled link with a flat intersecting its spherical and generally flat faces and arranged at an angle to the axis of said neck and adapted to be brought into mating relation with said teat of said another companion coupled link upon a predetermined manipulation thereof to permit said half-ball to pass said teat of said another companion coupled link and be so withdrawn from the socket of said another companion coupled link.

ALBERT W. SMITH.

REFERENCES CITED

The following references are of record in the file of this patent:

UNITED STATES PATENTS

| Number | Name | Date |
| --- | --- | --- |
| 1,956,298 | Paulson | Apr. 24, 1934 |
| 2,426,998 | Hall | Sept. 9, 1947 |